United States Patent [19]
Countryman

[11] 3,765,455
[45] Oct. 16, 1973

[54] FLEXIBLE SPOUT OPERATED FAUCET

[76] Inventor: James H. Countryman, 3324 Trailon Dayton, Ohio 45439

[22] Filed: Aug. 22, 1972

[21] Appl. No.: 282,762

[52] U.S. Cl.......... 137/625.4, 137/607, 137/614.11, 251/342, 251/349
[51] Int. Cl............................................. F16k 11/14
[58] Field of Search...................... 137/607, 614.11, 137/616, 616.3, 616.7, 625.4, 636; 251/342, 349

[56] References Cited
UNITED STATES PATENTS

| 1,864,978 | 6/1932 | Cottrell | 251/342 |
| 2,121,553 | 6/1938 | Stewart et al. | 137/607 X |
| 2,838,070 | 6/1958 | Williams | 137/616.7 X |
| 3,468,343 | 9/1969 | Siano | 137/607 X |
| 2,020,286 | 11/1935 | Bittle | 137/625.4 X |

Primary Examiner—Henry T. Klinksiek
Assistant Examiner—Richard Gerard
Attorney—B. Franklin Griffin, Jr. et al.

[57] ABSTRACT

A faucet is provided with a metering valve for controlling the mixing ratio of hot and cold water entering a mixing chamber, and a tilt valve for controlling, from shut off to full flow, the volume of water passing through the mixing chamber and into a flexible spout. Both valves are controlled by an elongated valve stem which extends into the spout. Total water flow as well as the relative mixture of hot and cold water is controlled by flexing the spout which then acts against the valve stem to adjust its position. The only moving parts comprise the valve stem and the gating elements of the valves, all of which may be integrally formed as a single piece.

12 Claims, 12 Drawing Figures

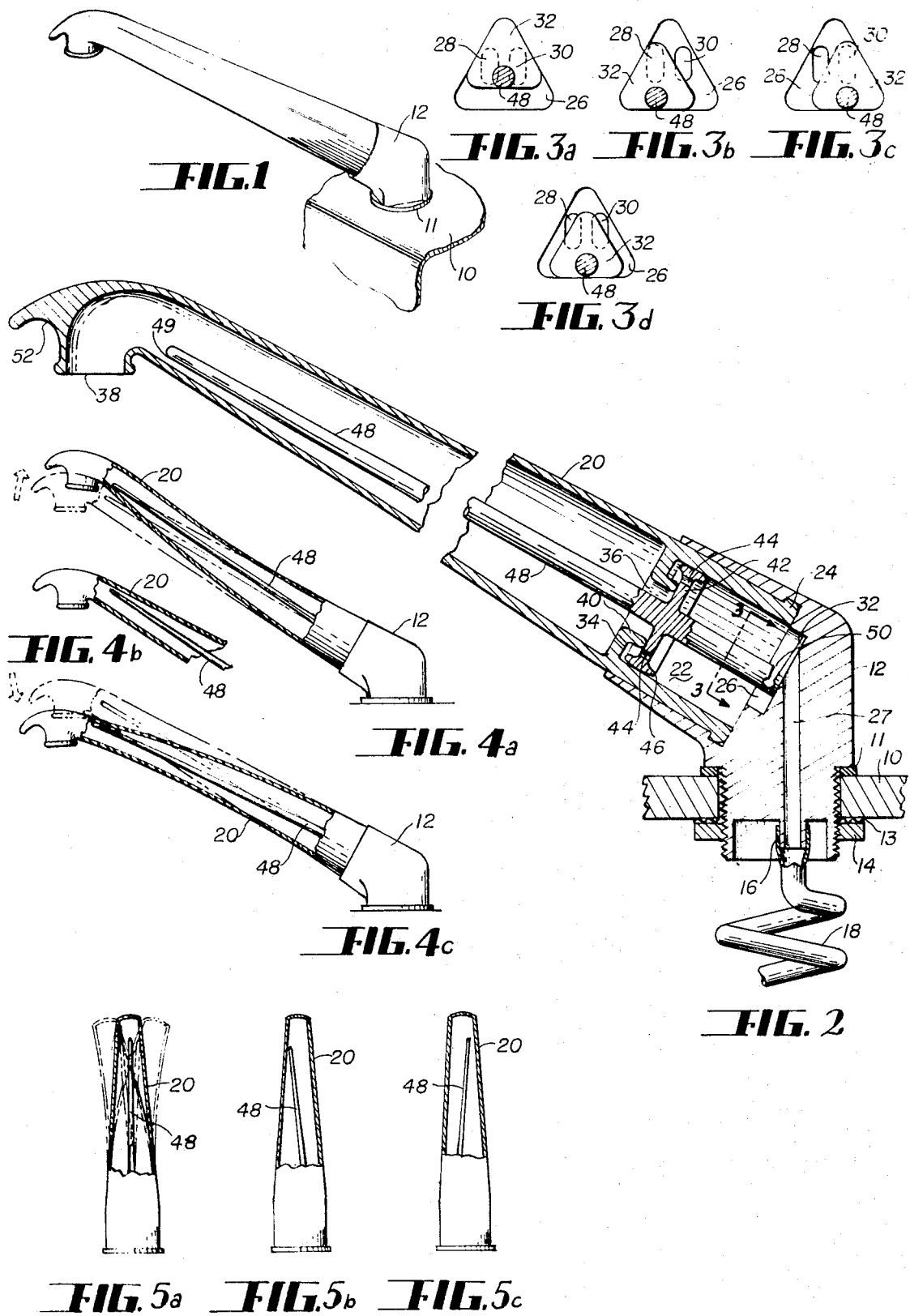

FLEXIBLE SPOUT OPERATED FAUCET

PRIOR ART

Spout operated mixing valves are known in the art. A typical mixing valve of this type is disclosed in U.S. Pat. No. 3,468,343. However, spout operated mixing valves heretofore known have had several undesirable characteristics. They have been expensive to manufacture and have required considerable maintenance after installation because they comprise numerous parts subject to wear. In addition, they have required numerous seals between moving parts to prevent leakage.

Because of these deficiencies, the spout operated mixing valves of the prior art have not been widely used as the mixing valve on sinks and wash basins found in the home.

BRIEF DESCRIPTION OF THE INVENTION

An object of the present invention is to provide a spout operated mixing valve which is inexpensive to manufacture and requires practically no maintenance.

An object of the present invention is to provide a spout operated mixing valve which does not leak and which does not require seals to prevent leaking.

An object of the present invention is to provide a spout operated mixing valve which has only one moving part.

Another object of the invention is to provide a mixing valve including a tilt valve and a metering valve, the tilt valve plate frictionally engaging the wall of the mixing valve chamber and being biased toward the closing position by the metering valve plate.

A further object of the invention is to provide a swivelly mounted faucet body member supporting a mixing chamber, a valve means and a spout, whereby said mixing chamber, valve means and spout all move with said faucet body member as it is swivelled.

A spout operated mixing valve in accordance with the present invention comprises a support, a hollow flexible spout cooperating with the support to form a mixing chamber, a metering valve element and a tilt valve element in the mixing chamber, and a valve operating stem operable in response to movement of the flexible spout to control both the valve elements. Hot and cold water passages extend through the support and terminate at ports in a surface of the mixing chamber. The metering valve element is movable over the surface to selectively block or obstruct the ports thereby adjusting the mixing ratio of hot and cold water entering the mixing chamber through the ports. The tilt valve element selectively blocks flow from the mixing chamber into the flexible spout, and thus also controls the total volume of hot and cold water entering the mixing chamber through the ports. The tilt valve element also provides a fulcrum point about which the valve operating stem may pivot when it is moved. The valve elements and the valve operating stem may be integrally formed as a single element in which case the valve has only one moving part.

BRIEF DESCRIPTION OF THE DRAWINGS

FIG. 1 is a fragmentary pictorial view of a sink having a spout operated mixing valve mounted thereon;

FIG. 2 is a sectional view of a spout and mixing valve constructed in accordance with the principles of the present invention;

FIGS. 3A through 3E are views taken along the line 3—3 of FIG. 2 and illustrating various positions of a gating valve element relative to hot and cold water inlet ports;

FIGS. 4A through 4C are fragmentary sectional side views illustrating the coaction between a flexible spout and a valve operating stem; and, FIGS. 5A through 5C are fragmentary sectional top views illustrating the coaction between a flexible spout and a valve operating stem.

DETAILED DESCRIPTION OF THE INVENTION

A preferred embodiment of the invention as illustrated in FIGS. 1 and 2 is adapted for use on a sink or basin 10. A bushing 11 extends into a hole in the sink and a support means 12 includes a threaded portion extending through the bushing and sink. A friction ring 13 is provided underneath the sink and lock nut 14 engages the threads on the support means to secure the support means on the sink. The arrangement is such that the support means may be turned or swivelled about a vertical axis. The support means is provided with any conventional means for connection to separate sources of hot and cold water. As illustrated in FIG. 2, this means may comprise nipples 16 extending from a bottom surface of the support means for receiving plastic tubing 18.

The upper portion of the support means has a recess or cavity for receiving a flexible spout means 20. When one end of the spout means is inserted into the cavity in the support means, it coacts with the support means to form a mixing chamber 22. The support means has an annular recess extending from the cavity and the end of the spout means inserted into the cavity has a peripherally extending flange 24 which engages the recess to lock the spout in place. The spout means is made of a flexible plastic material such as polyethylene so that it may be compressed and forced into the cavity in the support means 12. Upon insertion to the full depth of the cavity the spout means expands so that the peripheral flange 24 engages the recess in the support means.

The support means is formed with a further recess 26. Two fluid passages 27, one of which is illustrated in FIG. 2, extend through the support means from nipples 16 and terminate at two ports 28 and 30 (FIG. 3) in the recessed surface of the mixing chamber 22.

The relative mixture of hot and cold water entering into the mixing chamber 22 through ports 28 and 30 is controlled by a metering valve including a generally triangularly shaped valve element or valve plate 32. The shape of the metering valve plate 32 is best shown in FIG. 3. As is also shown in FIG. 3, the recess 26 provides in the region around ports 28 and 30 a flat and generally triangularly shaped surface so as to limit the extent of movement of the valve plate 32.

The spout means 20 has a valve seat means 34 extending from its interior wall and integrally formed therewith. The valve seat means has a central opening 36 formed therein to permit water to flow from the mixing chamber 22 through the hollow elongated portion of the spout means 20 to the discharge opening 38. The valve seating means includes a seating ring 40 extending in the direction of the mixing chamber 22 and around the opening 36. A tilt valve element or valve plate 42 is provided which seats against the seating ring 40 when the valve is in the off position to block the flow of water from the mixing chamber 22 into the spout. The tilt valve plate 42 is provided with a plurality of holes 44 so that when the valve plate is tilted with respect to the seating ring 40 water may flow through the holes 44 from whence it flows through the opening 36 in the valve seating means to the spout.

The valve plate 42 is a generally planar element having a circular configuration conforming with the internal configuration of the spout means 20. The valve plate is flanged or has a thickened periphery which frictionally but slidably contacts the interior surface, which is substantially cylindrical, of the mixing chamber. The outer edge of the flange is in the form of a substantially spherical arc, as indicated at 64, so that the valve plate may slide relative to the internal surface of the spout when the valve plate is tilted about its axis away from the position illustrated in FIG. 2.

An elongated valve stem means 48 is provided for operating both the valve plate 32 and the valve plate 42. The valve stem means has an elongated portion extending into the hollow passage in the spout and another portion which extends through the opening 36 in the valve seat means for connection to the valve plates 32 and 42. In a preferred embodiment, the valve stem means, the valve plate 32, and the valve plate 42, are all integrally formed from a single piece of material, preferably a resilient plastic such as polyethylene. The valve plate 32 is formed at one end of the valve stem and the valve stem is undercut in the region 50 so as to leave only a small cross section of the stem connected to the valve plate to act as a hinge. The valve plate and the valve stem are formed such that before the device is assembled the valve plate makes an angle somewhat less than 90° with the axis as a valve stem. When the valve stem is put into place and the spout inserted in the support means, the hinge portion of the valve stem is stressed as the valve plate 32 is moved into the position (shown in FIG. 2) where it extends substantially transverse to the axis of the valve stem. Thus, the tension in the hinge portion of the stem tends to rotate the force plate 32 so as to form the valve plate against the flat surface region surrounding the ports 28 and 30. The flat surface region opposes this force and a force is transmitted through the valve stem thereby tending to bias the tilt valve plate 42 toward the off or closed position.

FIG. 2 illustrates the mixing valve in its off position. The upper end of valve stem 48 is close to, but preferably does not touch, the lower wall of the spout. This permits the tilt valve plate 42 to be seated against the seating ring 40 to prevent the flow of water from the mixing chamber into the spout. The valve plate 32 is at its uppermost limit of travel as illustrated in FIG. 3A and covers both of the water inlet ports 28 and 30. It should be noted that although valve plate 32 covers the inlet ports 28 and 30, this plate does not function to control the rate of water flow. The tilt valve controls the rate of total water flow out of, and thus into, the mixing chamber. Valve plate 32 merely controls the relative mixture of hot and cold water in that total flow. This results from the fact that regardless of the position of valve stem 48, it always positions valve plate 32 so that more water can enter the mixing chamber than can exit therefrom past valve plate 42 when the valve stem is at that position.

The mixing valve may be operated so that water may flow from the spout by lifting or raising the end of the spout in a vertical plane. A gripper section 52 is provided on the end of the spout for this purpose. As the spout is lifted in a vertical plane the lower interior surface of the spout engages the tip 49 of the valve stem 48 and raises this tip. This is illustrated in FIG. 4A wherein the initial position of the spout and stem are shown in phantom outline and the raised position is shown in solid section. As the valve stem tip is raised the valve stem pivots about a point of contact between the tilt valve plate 42 and the tilt valve seating ring 40 thereby permitting a greater volume of water to flow from the mixing chamber 22. As the valve stem is tilted about this point the valve plate 32 moves from the position shown in FIG. 3A toward the position shown in FIG. 3D. As the valve plate 32 moves between these two positions it successively uncovers larger but equal areas of the ports 28 and 30 thus assuring that as the tilt valve is opened greater but equal volumes of hot and cold water enter the mixing chamber 22. With the valve plate 42 tilted about a point of contact with the seating ring 40, water may flow into the mixing chamber and then from the mixing chamber 22 through the holes 44, between the valve plate 42 and seating ring 40, through opening 36, and through the hollow spout 20 to the discharge opening 38. Because the peripheral edge of the valve plate 42 is substantiallly spherical, the friction between the valve plate 42 and the cylindrical interior wall of the mixing chamber is the same regardless of the pivoted position of the valve stem 48.

Once the spout has been lifted sufficiently to move the valve plate 32 to the position shown in FIG. 3D, the spout may be released but the valve stem will remain in the position to which it has been moved so that the mixing valve remains open. The lengths of spout 20 and valve stem 48, and the internal diameter of the spout and the diameter of the stem are chosen such that when the spout is released and returns to its normal position, the upper interior wall of the spout moves close to, but does not touch the stem in its fully operated position. This condition is illustrated in FIG. 4B. The valve stem is held in its operated position by friction between the periphery of valve plate 42 and the interior wall of the mixing chamber, and by the friction between the valve plate 32 and the mating surface region around the ports 28 and 30.

The flow of water may be stopped by applying hand pressure to the top of the flexible spout so as to deflect the spout from its normal position shown in phantom outline in FIG. 4C to a somewhat lower position illustrated in solid section in FIG. 4C. As the spout is depressed it engages the tip of the valve stem and upon further depression tilts the valve stem about a point of contact between the seating ring 40 and the valve plate 42. The right end of the valve stem carrying the valve plate 32 moves counterclockwise so that the valve plate 32 moves from the position shown in FIG. 3D to the position shown in FIG. 3A. At the same time, the valve plate 42 tilts to the fully seated position thus blocking the flow of water out of chamber 22. It might be noted at this point that the length of valve stem 48 between valve plates 32 and 42 is such that there is a slight compression of this portion of the valve stem. This insures that valve plate 42 fully seats against the seating ring 40.

At the time the valve plate 32 reaches a fully closed position, the spout is still being pressed downwardly against the tip of the valve stem. When the hand pressure is removed from the spout it returns to its normal position and all force is removed from the end of the valve stem. At this time the spout and valve stem assume the relative positions shown in FIG. 2.

It will be obvious from the foregoing description that the valve plate 32 need not be moved from the fully closed to the fully opened position illustrated in FIGS. 3A and 3D but may be moved to some intermediate position depending upon how far the spout is lifted, or to what degree it is depressed. Furthermore, it is not necessary that the spout be raised or lowered in a vertical plane only so that equal volumes of hot and cold water are admitted to the mixing chamber. FIG. 5A is a top view of the spout illustrating in phantom outline that the spout may be flexed horizontally as well as vertically. If the spout is moved toward the viewer of FIG. 2 as the spout is raised, it engages the tip of valve stem 48 and moves the valve stem so that the valve plate 32 moves from the position shown in FIG. 3A toward the position shown in FIG. 3B. Under these circumstances only the water available at port 30 may enter the mixing chamber 22, the volume of this water being determined by the degree to which the tip of valve stem 48 is tilted upwardly by the force exerted on it by the spout. On the other hand, if the spout is pushed away from the viewer of FIG. 2 at the same time the spout is raised, the valve plate 32 moves from the position shown in FIG. 3A to the position shown in FIG. 3C. Under these circumstances only water available at port 28 is permitted to enter the chamber 22 and the volume of water entering through this port is determined by the degree of tilt imparted to the valve stem.

As previously described with respect to vertical movement of the spout, it returns to its normal position after a horizontal, or a combined vertical and horizontal, force applied thereto is terminated. FIG. 5B illustrates the relative positions of the spout and the valve stem after the valve plate 32 has been moved to the position shown in FIG. 3B and all force has been removed from the spout. FIG. 5C shows the relative positions of the spout and the valve stem after the valve plate 32 has been moved to the position shown in FIG. 3C and all force has been removed from the spout.

From the foregoing description it is evident that the valve plate 32 may be moved to any desired position within the area bounded by the walls of recess 26. This is accomplished by applying a force to deflect the spout against the tip 49 of the valve stem thereby tilting the valve stem about a point of contact between the seating ring 40 and the valve plate 42. The particular point of contact about which the valve stem is tilted will vary depending upon the direction in which force is applied to the spout. However, all of these pivot points lie in the plane of contact between valve plate 42 and seating ring 40. This mode of operation permits the construction of a simple spout operated mixing valve requiring one moving part. Furthermore, this part as well as a flexible spout may be constructed of a resilient plastic material such as polyethylene and mass produced at very low cost.

A novel aspect of the invention is the fact that the mixing chamber, tilt valve, and metering valve all pivot when the support member 12 is pivoted. This is accomplished by grasping the spout at a point toward the region where the spout joins the support member. By grasping and applying a force in this region, the whole assembly may be turned or swivelled without changing the rate of water flow of the relative mixture of hot and cold water.

While a preferred embodiment of the invention has been described in detail, various modifications and substitutions may be made therein. For example, the valve stem and valve plates may be separate elements rather than integrally formed. The mixing chamber may be formed wholly within either the spout or the support means. Further modifications and substitutions may be made without departing from the spirit and scope of the invention as defined by the appended claims.

I claim:
1. A mixing valve comprising, in combination:
   means defining a mixing chamber having inlet ports and an outlet;
   a metering valve element disposed adjacent said inlet ports for controlling the relative mix of two fluids flowing into said mixing chamber;
   a tilt valve element disposed adjacent said outlet for controlling the volume of flow through said chamber and out of said outlet;
   valve stem means for concurrently operating both said metering valve element and said tilt valve element, said valve stem means including means connected between said metering valve element and said tilt valve element for biasing said tilt valve element toward a seating position;
   said tilt valve element being in sliding engagement with the means defining said mixing chamber at least at points about the periphery of said valve element.

2. The combination as claimed in claim 1 and further comprising a flexible spout for conveying fluid from said outlet to a discharge opening along a path which encircles at least a portion of said valve stem means, whereby both the relative mix and total volume of fluid delivered to said discharge opening may be controlled by flexing said spout.

3. The combination as claimed in claim 1 wherein said valve stem means, said tilt valve element, and said metering valve element are integrally formed as a single element of plastic material.

4. The combination as claimed in claim 2 and further comprising support means adapted for swivel mounting on a support surface, said support means supporting all the other elements of the combination whereby said discharge opening may be moved in an arcuate path in response to a force transmitted to said support means through said flexible spout.

5. The combination as claimed in claim 2 wherein a tilt valve seating ring extends into said mixing chamber around the periphery of said outlet, said valve stem means includes a valve stem extending through said outlet, and said tilt valve element is mounted on said valve stem at a point intermediate the ends thereof, whereby said valve may pivot about points of contact between said tilt valve element and said tilt valve seating ring.

6. The combination as claimed in claim 5 wherein said metering valve element is hingedly connected to one end of said valve stem in said mixing chamber, said mixing chamber having a generally triangularly shaped recess in the region surrounding said inlet ports, and said metering valve element is also generally triangularly shaped and positioned for movement in said recess to selectively obstruct said inlet ports.

7. The combination as claimed in claim 6 wherein said valve seating ring and said tilt valve element cooperate to pivot said valve stem about a point in the plane of contact between the valve seating ring and the tilt valve element when force is applied to the valve stem by the flexible spout, said tilt valve element controlling total flow volume of fluids into and through said mixing chamber and said spout when the valve stem pivots in any plane, and said metering valve element controlling the relative mix of fluids entering said mixing chamber through said inlet ports.

8. A spout operated mixing valve comprising:
   valve support means,
   a flexible hollow spout mounted on said support means and cooperating therewith to form a mixing chamber,
   said valve support means having first and second passages therein terminating at first and second ports in a surface of said mixing chamber;
   said spout having within it a valve seat including a seating ring extending toward said chamber, and around a central opening;
   a metering valve element and a tilt valve element disposed within said chamber,
   said metering valve element cooperating with said surface to selectively control the relative mix of fluids entering said chamber from said passages and,
   said tilt valve element controlling the flow of fluid from said chamber to said spout; and,
   an elongated valve stem for operating both said valve elements,
   one end of said valve stem extending through said opening into said hollow spout to operate said valve elements when said flexible spout is deflected sufficiently to engage and move said one end.

9. A spout operated mixing valve as claimed in claim 8 wherein said metering valve element, said tilt valve element, and said stem are integrally formed as one piece of material, said metering valve element being formed at the end of said stem in said chamber as a plate-like element extending transverse to the axis of said stem, said tilt valve element being formed about the axis of said stem in a plane transverse to said axis and intermediate the stem ends whereby force applied to said stem by said spout pivots said stem about a point lying in the plane of contact between said seating ring and said tilt valve element.

10. A spout operated mixing valve as claimed in claim 9 wherein said chamber surface in the region including said ports is recessed generally in the form of a triangle with a flat bottom surface,
   said metering valve element being generally of smaller triangular shape with a flat bottom and disposed in said recess;
   said material being flexible enough to permit hinged relative motion of said metering valve element relative to said stem as said stem is pivoted.

11. A mixing faucet of the type adapted to provide swivelling movement of a spout relative to a support surface, said faucet comprising:
   means defining a mixing chamber having inlet ports and an outlet;
   first valve means for controlling the relative mixture of two fluids entering said mixing chamber through said inlet ports;
   second valve means for controlling the rate of flow of mixed fluids from said chamber;
   a spout having a discharge opening for conveying fluid passing through said mixing chamber to said discharge opening, said spout operating said first and second valve means in response to movement of said spout relative thereto; and,
   a faucet support member adapted to be swivelly mounted on a support surface, said faucet support member supporting said means defining the mixing chamber, said spout, and said first and second valve means, whereby the position of said discharge opening may be varied by moving said spout without moving said spout relative to said first and second valve means, so that neither the rate of flow nor the relative mixture of fluids is varied as said spout is moved.

12. A mixing faucet as claimed in claim 11 wherein said spout is a flexible spout.

* * * * *

PO-1050
(5/69)

UNITED STATES PATENT OFFICE
CERTIFICATE OF CORRECTION

Patent No. 3,765,455  Dated  October 16, 1973

Inventor(s) James H. Countryman

It is certified that error appears in the above-identified patent and that said Letters Patent are hereby corrected as shown below:

Column 3, line 14, change "64" to -- 46 --.

Column 3, line 41, change "force" to -- valve --.

Column 3, line 41, change "form" to -- force --.

Column 4, line 25, delete "Because the peripheral".
          lines 26-29, delete the lines.

Column 4, line 45, after "." insert -- Because the peripheral edge of the valve plate 42 is substantially spherical, the friction between the valve plate 42 and the cylindrical interior wall of the mixing chamber is the same regardless of the pivoted position of the valve stem 48. --.

Column 6, line 1, change "of" (second occurrence) to -- or --.

Signed and sealed this 1st day of October 1974.

(SEAL)
Attest:

McCOY M. GIBSON JR.
Attesting Officer

C. MARSHALL DANN
Commissioner of Patents